Aug. 25, 1936.                C. IDDINGS                2,052,297
                        CARBON BISULPHIDE PROCESS
                          Filed Oct. 18, 1933
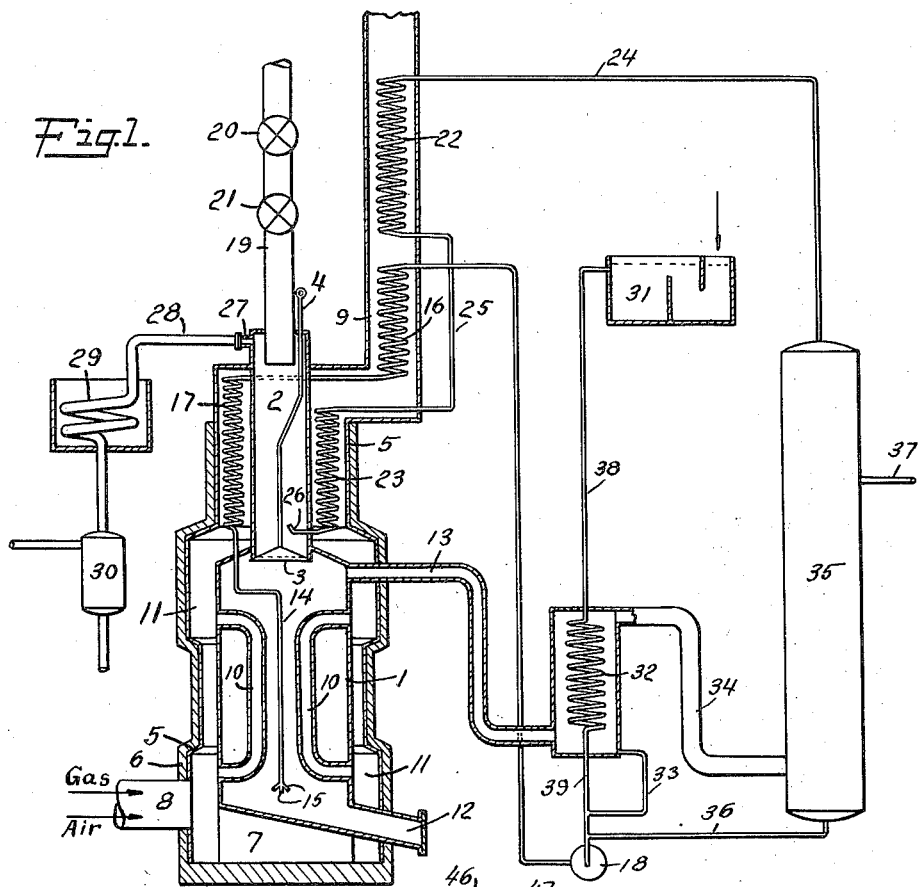
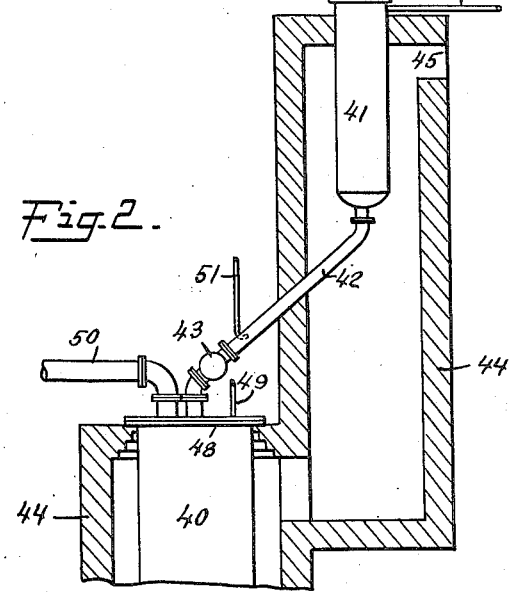
INVENTOR
CARL IDDINGS
BY
ATTORNEY Patented Aug. 25, 1936

2,052,297

UNITED STATES PATENT OFFICE 2,052,297

CARBON BISULPHIDE PROCESS

Carl Iddings, Staten Island, N. Y., assignor to General Chemical Company, New York, N. Y., a corporation of New York Application October 18, 1933, Serial No. 694,106

7 Claims. (Cl. 23—206)

This invention relates to a process and apparatus for the production of carbon bisulphide by the reaction of carbon with sulphur.

Carbon bisulphide may be formed by the reaction of sulphur and heated carbon, for example, coke or charcoal. The sulphur in the form of a vapor is passed in contact with carbon at an elevated temperature and the vapors leaving the retort contain, in addition to the carbon bisulphide, a proportion of hydrogen sulphide and other impurities. The principal cause for the formation of the hydrogen sulphide and other impurities has been found to reside in the moisture, hydrocarbons and the like, which are contained in the carbon which reacts with the sulphur, and it has heretofore been proposed to heat charcoal at elevated temperatures prior to its introduction into a retort where it is reacted with the sulphur. The purpose of this preliminary heating treatment of the carbon is to drive out water vapor and hydrocarbons and thus decrease the proportion of impurities in the carbon bisulphide formed by reaction of the heated carbon.

I have found that by thus heating charcoal to temperatures up to, for example, 1000° C., the carbon bisulphide later formed from the thus treated charcoal is of improved purity as compared with the product from charcoal not thus preheated, but nevertheless it still contains a substantial proportion of hydrogen sulphide, carbonyl sulphide and the like. While preliminarily heating the charcoal to temperatures exceeding 1000° C. somewhat improves the quality of the carbon bisulphide product, such operation is not economical since it requires the expenditure of large amounts of energy in order to obtain the high temperatures and necessitates preliminarily heating the charcoal to a temperature materially higher than the temperatures required for the subsequent reaction of the charcoal with the sulphur.

It is an object of this invention to provide a novel process for the treatment of carbon which is subsequently to be reacted with sulphur for the production of carbon bisulphide, comprising preliminarily heating the carbon while passing in contact with it a substantially inert gas. This gas is preferably the mixture of low boiling impurities known as tail gas (the impurities boiling below the boiling point of carbon bisulphide itself) which are separated from the carbon bisulphide product of this process. The inert gas is preferably preheated before being passed in contact with the carbon and the carbon itself is also preferably heated during this treatment prior to its being reacted with sulphur vapors. It is a further object of this invention to provide a novel process and apparatus whereby the heat required for the preliminary heating of the carbon is obtained from heating gases which have first been utilized for heating a retort in which the carbon and sulphur are reacted. Further objects of the invention will appear hereinafter.

The apparatus of this invention comprises a retort and a heating chamber each of which is positioned within a heating chamber whereby hot gases may be passed about the exterior of the retort and thence about the exterior of the heating chamber. The apparatus further comprises means for introducing carbon, for example charcoal, into the heating chamber and thence into the retort. Means are provided for introducing an inert gas such as tail gas from a carbon bisulphide purification system into the heating chamber and passing the gas therethrough in contact with the heated carbon. Means are also provided in connection with the retort for introducing sulphur into contact with the heated carbon therein and for withdrawing from the retort the carbon bisulphide formed. The process of this invention as it may be carried out in this apparatus, comprises preliminarily heating carbon while passing in contact with it a substantially inert gas and then reacting the thus treated carbon with sulphur vapors to form carbon bisulphide. In its preferred embodiment, the invention comprises the foregoing process together with a treatment of the carbon bisulphide vapors leaving the retort for their purification from impurities having boiling points both above and below the boiling point of the carbon bisulphide and withdrawing from this purification treatment the mixture of low boiling impurities which are utilized as the inert gas passed in contact with the carbon during its preliminary heating.

The accompanying drawing illustrates two embodiments of the apparatus of this invention suitable for carrying out my novel process. In the drawing, Fig. 1 is an elevation partly in cross-section and partly in view of one form of apparatus suitable for carrying out my process, which comprises a retort and its appurtenances for manufacturing carbon bisulphide and a purification system for the crude product. Fig. 2 shows in elevation another modification of the retort and heating chamber of this invention.

Referring to Fig. 1 of the drawing, the numeral 1 indicates a carbon bisulphide retort with a superimposed heating chamber 2 separated from the retort by means of a valve 3 which may be opened or closed as desired by raising or lowering the valve by means of a rod 4. The retort and heating chamber are within a shell 5 which is overlaid with a heat-insulating material 6. The retort and heating chamber are supported upon a brickwork pier 7. An inlet 8 at the bottom of shell 5 is provided for the introduction of hot products of combustion of, for example, a combustible gas and air which may thus be passed upwardly within shell 5 and about retort 1 and heating chamber 2 and thence through an offtake stack 9 to a heat recuperator (not shown) whereby the air employed for burning the gas to provide the hot products of combustion introduced through inlet 8 may be preheated.

Retort 1 is provided with a plurality of internal flues 10 which open into the space 11 between shell 5 and the retort, both at the bottom and the top portions of the retort. Thus a portion of the hot gases introduced into the bottom of space 11 may circulate through flues 10 in heat exchange relationship with the interior portion of a bed of charcoal which is maintained within the retort. The diameter of shell 5 is somewhat restricted between points opposite the upper and lower ends of flues 10 to make space 11 more narrow between these points than above and below the ends of the flues. This construction promotes the circulation of the heating gases through the flues. The bottom of retort 1 is provided with an outlet 12 for the withdrawal of ash and slag and a pipe 13 communicates with the top of the retort for the withdrawal therefrom of carbon bisulphide vapors formed by reaction of carbon and sulphur within the retort. The sulphur is introduced into the retort in the form of a vapor which is passed through a pipe 14 entering the top of the retort and extending downwardly through the bed of coke therein and terminating in a plurality of open branches 15 near the bottom of the retort. Heating coils 16 and 17 in offtake pipe 9 and the space between the walls of chamber 2 and shell 5, respectively, serve for vaporizing molten sulphur supplied to coil 16 from a pump 18 and for preheating the vapors of sulphur during their passage through the coils. The thus preheated sulphur vapors are passed through pipe 14 in heat exchange with the bed of carbon within retort 1 so that as the vapors of sulphur leave branches 15 and pass into direct contact with the carbon they are substantially at the temperature of the carbon bed itself.

A chute 19, provided with valves 20 and 21 for controlling the passage of carbon through the chute, opens into the top of heating chamber 2 and serves for keeping this chamber substantially filled with carbon. The carbon in chamber 2 is heated by means of the heating gases which, after passing about retort 1, pass about chamber 2 before entering offtake pipe 9. A heating coil 22 in offtake pipe 9 and another heating coil 23 in space 11 between chamber 2 and shell 5 are provided for preheating tail gas introduced from pipe 24 into coil 22 and thence passed through pipe 25 to coil 23 and into the bottom of chamber 2 through pipe 26. A gas outlet 27 from the top of chamber 2, communicating with pipe 28 which, in turn, leads to a condensing coil 29 and a liquid-gas separating vessel 30, serves for withdrawing gases from the top of chamber 2, condensing from the gases condensable constituents such as tar and water, and separating the condensate from the relatively permanent gases such as hydrogen sulphide and carbonyl sulphide. These gases may be withdrawn for treatment by known methods for the production therefrom of sodium sulphide, for example.

The apparatus shown in the drawing comprises the additional features of a sulphur melting vessel 31, whence molten sulphur may be passed through a pipe 38 to heat exchanger 32 in which it is heated by means of the hot gases withdrawn from the top of retort 1 and thence passes to sulphur pump 18 through pipe 39. The molten sulphur in heat exchanger 32 serves to cool the vapors introduced therein from the retort to a temperature at which sulphur which is contained as an impurity in the vapors condenses. The liquid sulphur is withdrawn from the bottom of heat exchanger 32 through pipe 33 and passed to pump 18. From heat exchanger 32 the gases and vapors are passed through a pipe 34 to a purification system shown diagrammatically as a rectifying tower 35 which serves for the purification of the gases and vapors. High boiling impurities, principally consisting of sulphur, may be withdrawn from the bottom of tower 35 through a pipe 36 and returned to be mingled with molten sulphur from sulphur melting vessel 31 passing to pump 18. Liquid carbon bisulphide is withdrawn from the mid-portion of tower 35 through a pipe 37 and low boiling impurities, principally consisting of hydrogen sulphide and carbonyl sulphide, pass off from the top of tower 35 and are returned through pipe 24 for preheating and introduction into chamber 2 as described above.

In utilizing the apparatus described above and shown in Fig. 1 of the drawing for the production of carbon bisulphide, retort 1 and chamber 2 are charged with charcoal which is heated by means of hot products of combustion introduced within shell 5 and passed upwardly about the retort and chamber, a portion of the combustion gases being passed through flues 10 and thus serving to convey heat into the internal portions of the charge of charcoal in the retort. When the charcoal in the retort has reached a temperature suitable for its reaction with sulphur vapors, for example a temperature of about 850° C., molten sulphur is pumped into heating coil 16 where it is vaporized and heated and the vapors further heated by passage through coil 17 and pipe 14 and are introduced at the bottom of retort 1 into direct contact with the charcoal in the retort. The thus heated vapors of sulphur react with the carbon in the retort to form carbon bisulphide which is withdrawn through pipe 13 and, after passing through heat exchanger 32, are purified in tower 35. The low boiling impurities from tower 35 are preheated in heating coils 22 and 23 and, at a temperature of about 800° C., are introduced into and passed through the charcoal in heating chamber 2 which is also heated by the hot gases passing about this retort. By the conjoint action of the high temperature (which preferably should be at least about 800° C.) and the passage of the hot tail gas, the charcoal in heating chamber 2 is substantially freed of its content of water and air, and is even purified of relatively high boiling tarry constituents which are withdrawn admixed with the tail gas through outlet 27 and pipe 28. As the charcoal in retort 1 is used up by reaction with the sulphur vapor, additional charcoal, which has been preliminarily heated and treated with tail gas in chamber 2, is dropped into the retort by lowering valve 3 and additional charcoal is introduced into chamber 2 through chute 19 by manipulation of valves 20 and 21 and treated in chamber 2 preparatory to its passage into retort 1.

The apparatus shown in Fig. 2 of the drawing comprises a carbon bisulphide retort 40 and heating chamber 41. The heating chamber communicates with the top of the retort by way of a pipe 42 through which carbon may be passed in amounts controlled by means of a star valve 43. Retort 40 and chamber 41 are in a brickwork setting 44 arranged for passing heating gases about the retort and then about the heating chamber, the gases passing out of setting 44 through an outlet 45. Chamber 41 is provided with a gas-tight cover 46 and a gas outlet pipe 47 leading from the top of the chamber. Retort 40 is also provided with a top closure 48, inlet pipe 49 for the introduction of sulphur into the retort and an outlet pipe 50 for conducting carbon bisulphide vapors out of the retort. A pipe 51 enters pipe 42 and terminates therein at a point between valve 43 and chamber 41. Pipe 51 serves for introducing an inert gas into pipe 42 and chamber 41 whereby the gas may be passed through the body of carbon in the pipe and chamber and leave the chamber through pipe 47.

In carrying out the process of this invention employing the apparatus shown in Fig. 2, charcoal is fed into retort 40, heated to the desired temperature, and reacted with sulphur introduced through pipe 49 either as vapor or as liquid sulphur, which latter is vaporized in the retort. Charcoal is introduced into heating chamber 41 and there heated while tail gas is passed through the chamber in contact with the charcoal. The thus treated charcoal is fed through pipe 42 into retort 40 to replace the charcoal used up by reaction with the sulphur. The rate of feeding the charcoal to the retort is controlled by the rate with which star valve 43 is operated. The introduction of tail gas into pipe 42 serves to sweep out of the charcoal air, water vapor, and other gaseous substances which would deleteriously affect the reaction of the charcoal and sulphur in the retort. As the supply of charcoal in heating chamber 41 becomes exhausted, fresh charcoal may be introduced therein by removing the cover of the chamber. While thus recharging the heating chamber the supply of tail gas to pipe 42 should be interrupted. By providing the heating chamber with a pipe through which charcoal may be fed at a desired rate by means of a star valve in the pipe (an arrangement like pipe 42 and valve 43 leading to retort 40) fresh charcoal may be continuously supplied to the heating chamber instead of discontinuously as described above, and the entire operation of the heating chamber and retort thus made a continuous one.

Numerous changes and modifications may be made in the apparatus described above and in the process as carried out in that apparatus without departing from the scope of this invention. The showing in the drawing and the foregoing description, particularly of the purification system for the crude carbon bisulphide vapors with separation of tail gas, is diagrammatic and is particularly susceptible to numerous modifications and changes.

I claim:

1. In a process for the production of carbon bisulphide by the reaction of carbon and sulphur at an elevated temperature that improvement which comprises preliminarily heating said carbon while passing in contact therewith a substantially inert gas, and then reacting the thus treated carbon with sulphur to form carbon bisulphide.

2. In a process for the production of carbon bisulphide by the reaction of carbon and sulphur and the purification of the resulting crude carbon bisulphide product to separate therefrom a tail gas comprising low boiling impurities that improvement which comprises preliminarily heating said carbon, passing said tail gases in contact with the heated carbon and then reacting the thus treated carbon with sulphur to form carbon bisulphide.

3. In a process for the production of carbon bisulphide by the reaction of carbon and sulphur and the purification of the resulting crude carbon bisulphide product to separate therefrom a tail gas comprising low boiling impurities that improvement which comprises preliminarily heating said carbon to a temperature of at least about 800° C., preheating said tail gases, passing the thus preheated tail gases in contact with the carbon while heating the carbon as aforedescribed, and then reacting the thus treated carbon with sulphur to form carbon bisulphide.

4. The process for the production of carbon bisulphide which comprises passing a heating gas in heat exchange relation with a bed of charcoal while introducing into said bed preheated sulphur vapors and withdrawing therefrom the carbon bisulphide formed by reaction of the sulphur vapors and carbon, passing said heating gases after transfer of heat therefrom to said bed of carbon in indirect heat exchange relationship with a body of charcoal to heat the charcoal to an elevated temperature, passing through said charcoal tail gas from a carbon bisulphide purification system to remove from the heated charcoal impurities contained therein, preheating said tail gases prior to introduction into contact with said charcoal by passing said gas in heat exchange with the hot gases used for heating said charcoal, and replenishing the aforesaid bed of carbon undergoing reaction with sulphur vapors by supplying thereto the thus treated charcoal.

5. The process for the production of carbon bisulphide which comprises preheating carbon while passing a stream of inert gas in direct contact therewith, separately bringing the preheated carbon into reactive contact with sulphur and withdrawing the gaseous products of reaction from contact with the carbon, and removing carbon bisulphide from the thus withdrawn gases.

6. A process for the production of carbon bisulphide by the reaction between carbon and sulphur at an elevated temperature which comprises preliminarily heating the carbon, bringing the thus heated carbon into reactive contact with sulphur, withdrawing the gaseous reaction products containing carbon bisulphide from contact with the carbon, removing carbon bisulphide from said reaction products, and during the aforesaid preliminary heating of the carbon, passing in direct contact therewith a stream of inert gas other than said gaseous reaction products containing carbon bisulphide.

7. The process for the production of carbon bisulphide which comprises passing a heating gas in indirect heat exchange relationship with a bed of charcoal while introducing into said bed preheated sulphur vapors and withdrawing therefrom the carbon bisulphide formed by reaction of the sulphur vapors and carbon, passing said heating gases after transfer of heat therefrom to said bed of carbon in indirect heat exchange relationship with a body of charcoal to heat the charcoal to an elevated temperature, passing tail gases from a carbon bisulphide purification system through said charcoal to remove impurities from the heated charcoal, and replenishing the aforesaid bed of carbon undergoing reaction with sulphur vapors by supplying thereto the thus treated charcoal.

CARL IDDINGS.